United States Patent [19]

Lindacher et al.

[11] Patent Number: 5,484,990
[45] Date of Patent: Jan. 16, 1996

[54] MULTIPLE DEPTH OF FIELD LASER OPTICAL SCANNER

[75] Inventors: Joseph M. Lindacher, Duluth; Stephen J. Ames, Lawrenceville, both of Ga.

[73] Assignee: NCR Corporation Information Solutions Company, Dayton, Ohio

[21] Appl. No.: 168,102

[22] Filed: Dec. 15, 1993

[51] Int. Cl.⁶ .................................................. G06K 7/10
[52] U.S. Cl. .......................................... 235/467; 235/472
[58] Field of Search ...................................... 235/467, 472

[56] References Cited

U.S. PATENT DOCUMENTS

| | | | |
|---|---|---|---|
| 4,560,862 | 12/1985 | Eastman et al. | 235/467 |
| 4,591,242 | 5/1986 | Boockman et al. | 305/3.71 |
| 4,748,316 | 5/1988 | Dickson | 235/454 |
| 4,820,911 | 4/1989 | Arackellian et al. | 235/467 |
| 4,841,129 | 6/1989 | Tawara et al. | 235/472 |
| 5,179,271 | 1/1993 | Lindacher et al. | 235/467 |

FOREIGN PATENT DOCUMENTS 41585  2/1991  Japan ..................... 235/467

*Primary Examiner*—John Shepperd
*Attorney, Agent, or Firm*—Paul W. Martin

[57] ABSTRACT

A multiple depth of field optical scanner which produces a plurality of scan beams having different focal distances. The optical scanner includes a laser beam having a centerline, a mirrored spinner having a plurality of facets with different curvatures, a detector, and a microcontroller. The optical scanner may additionally include a deflector mirror for changing the direction of the laser beam, collecting optics for equalizing the optical coupling of the reflected light across the field of view of the facets, a distance selection circuit for instructing the microcontroller within the scanner to decode bar code information from a predetermined range of focal distances and an amplification circuit for amplifying the electrical signals from the detector enough to produce other electrical signals having substantially equal amplitudes. The microcontroller may also include the feature of reducing laser power when the scan beams focus more than a predetermined distance from the centerline of the laser beam.

38 Claims, 5 Drawing Sheets

MULTIPLE DEPTH OF FIELD LASER OPTICAL SCANNER

BACKGROUND OF THE INVENTION

The present invention relates to optical scanners, and more specifically to a multiple depth of field laser optical scanner.

Optical scanners are well known for their usefulness in collecting and processing information within bar code labels. Optical scanners that generate scan patterns made up of intersecting lines typically employ a laser, a mirrored spinner, and a photodetector. The laser emits a laser beam which is reflected by the mirrored spinner to form the lines of the scan pattern. The photodetector collects light reflected from items having bar code labels and converts the reflected light into electrical signals based upon its intensity.

The depth of field of laser optical scanners is limited by diffraction of the laser beam. The waist size of the beam is only small enough to resolve the bar code transitions over a small depth of field. Typically, the depth of field of a laser optical scanner which must read a bar code label with a 0.013-inch transition spacing is only about six inches. The depth of field for reading higher density (lower transition spacing) bar code labels is even less.

Therefore, it would be desirable to provide a multiple depth of field laser optical scanner which can read bar code labels located within a range of distances from the scanner.

SUMMARY OF THE INVENTION

In accordance with the teachings of the present invention, a multiple depth of field laser optical scanner is provided. The optical scanner includes a laser beam having a centerline, a mirrored spinner having a plurality of facets with different curvatures, a detector, and a microcontroller. The optical scanner may additionally include a deflector mirror for changing the direction of the laser beam, collecting optics for equalizing the optical coupling of the reflected light across the field of view of the facets, a distance selection circuit for instructing the microcontroller within the scanner to decode bar code information from a predetermined range of focal distances and an amplification circuit for amplifying the electrical signals from the detector enough to produce other electrical signals having substantially equal amplitudes. The microcontroller may also include the feature of reducing laser power when the scan beams focus more than a predetermined distance from the centerline of the laser beam.

It is accordingly an object of the present invention to provide a multiple depth of field laser optical scanner.

It is another object of the present invention to provide a multiple depth of field laser optical scanner which includes a mirrored spinner having a plurality of facets of different curvature.

It is another object of the present invention to provide a multiple depth of field laser optical scanner which includes an amplification circuit for amplifying electrical signals from a detector to the same level.

It is another object of the present invention to provide a multiple depth of field laser optical scanner which reduces laser power for scan beams which focus more than a predetermined distance from the centerline of the laser beam.

It is another object of the present invention to provide a multiple depth of field laser optical scanner which includes a distance selection circuit which allows a user to select different processing ranges.

It is another object of the present invention to provide a multiple depth of field laser optical scanner which includes a single detector for detecting all of the scan beams.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings in which:

DETAILED DESCRIPTION OF THE PREFERRED EMBODIMENT

Figure 1:
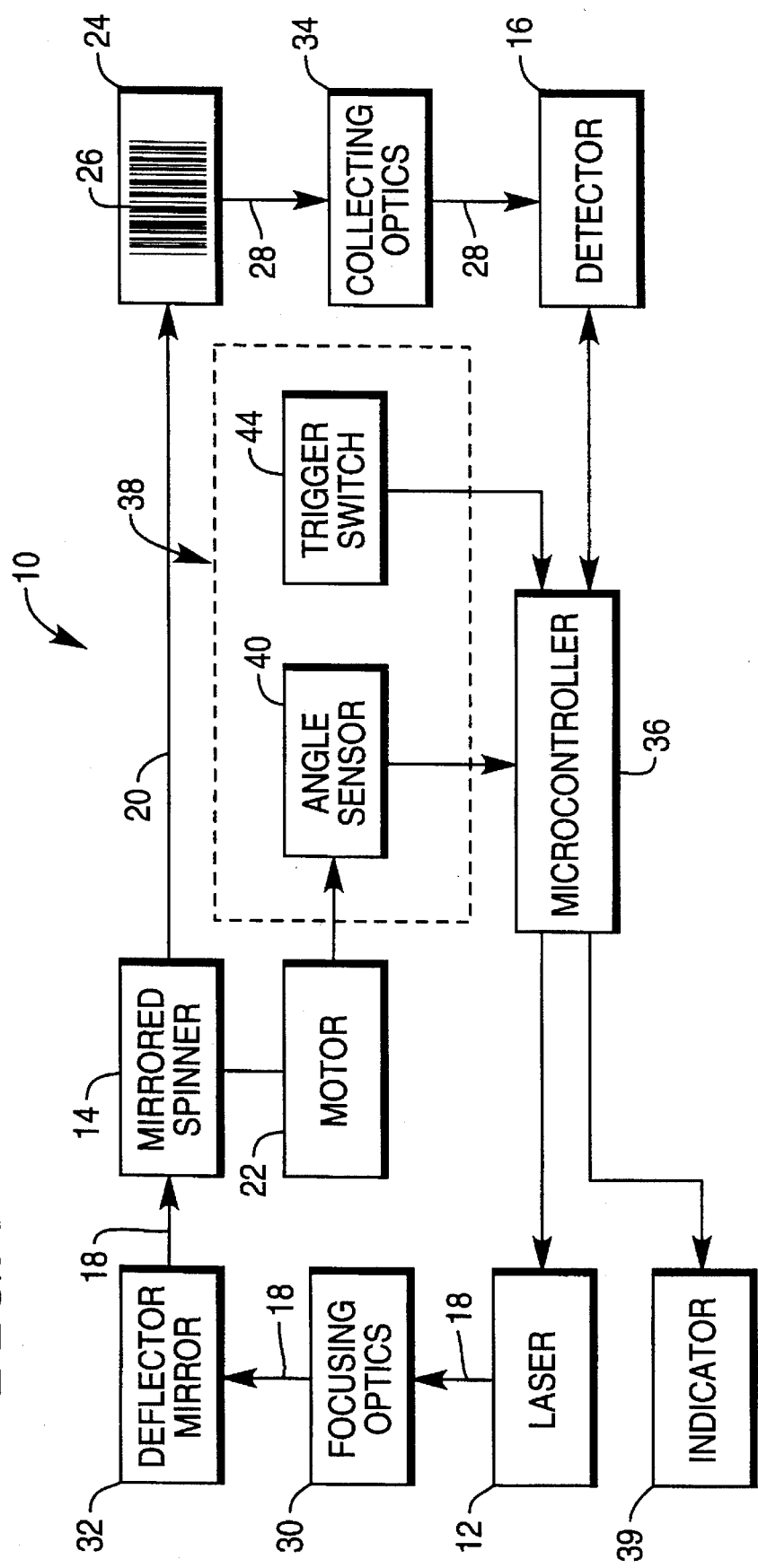
FIG. 1 is a block diagram of the multiple depth of field optical scanner of the present invention.

Referring now to FIG. 1, multiple depth of field laser optical scanner 10 includes laser 12, mirrored spinner 14, detector 16, focusing optics 30, deflector mirror 32, Fresnel lens 34, microcontroller 36, distance estimating circuit 38, and indicator 39.

Laser 12 is preferably a laser diode.

Mirrored spinner 14 reflects a laser beam 18 to produce scan beams 20. Mirrored spinner 14 includes a plurality of facets of different curvature. Motor 22 rotates mirrored spinner 14.

Detector 16 is preferably a photodetector which collects light reflected from an item 24 having a bar code label 26 and converts the reflected light 28 into electrical signals based upon the intensity of reflected light 28.

Focusing optics 30 focuses laser beam 18 well beyond focusing optics 30.

Deflector mirror 32 changes the direction of laser beam 18.

Fresnel lens 34 equalizes the optical coupling for reflected light 28 across the field of view and preferably has an f-number of one-half. Also, the center of detector 16 is preferably masked by an opaque barrier.

Microcontroller 36 controls operation of laser 12, detector 16, and motor 22, and processes bar code information from detector 16.

Distance estimating circuit 38 provides estimates of bar code distance to microcontroller 36. Distance estimating circuit 38 includes angle sensor 40 and trigger switch 44.

Indicator 39 receives a valid or invalid read signal from microcontroller 36 and provides a valid or invalid read indication to a user.

Angle sensor 40 tells microcontroller 36 which of the facets is being illuminated and its exact angular position.

Figure 2:
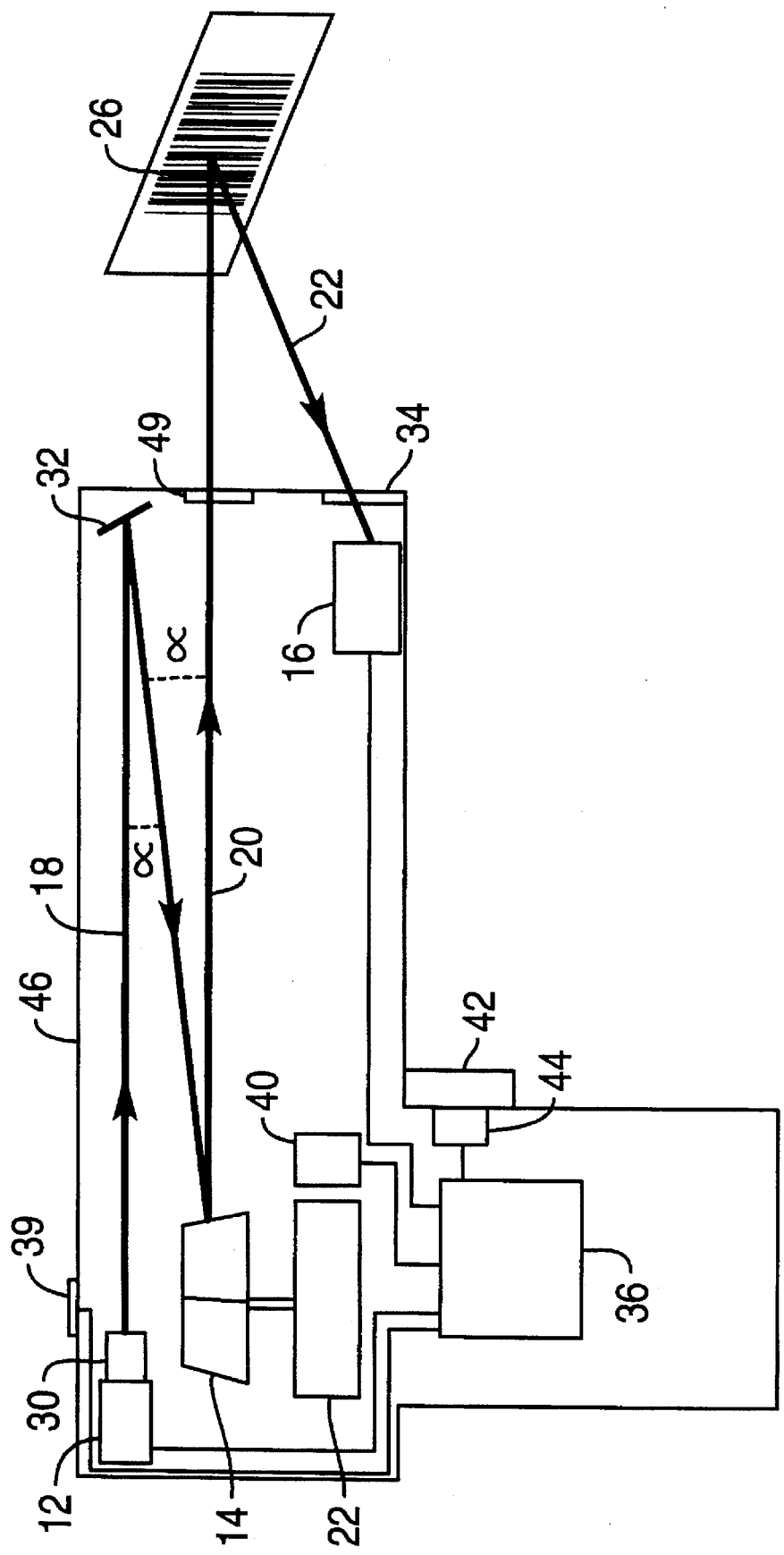
FIG. 2 is a diagrammatic view of the scanner of the present invention.

Trigger switch 44 is actuated by pressing trigger 42 (FIG. 2). In a first embodiment, a single click of trigger 42 by the user may tell microcontroller 36 that bar code label 26 is located near a focal plane close to scanner 10, while a double click tells microcontroller 36 that bar code label 26 is located near a focal plane far from scanner 10 or in another embodiment, tells microcontroller 36 that bar code label 26 may be located anywhere within scan volume 60.

Turning now to FIG. 2, multiple depth of field optical scanner 10 is shown in more detail. Housing 46 is shown as a gun-shaped housing, although the present invention is applicable to counter-top and other types of scanners. Housing 46 has a barrel portion 48 which contains laser 12, mirrored spinner 14, motor 22, angle sensor 40, deflector mirror 32, detector 16, and Fresnel lens 34.

Deflector mirror 32 deflects laser beam 18 back towards mirrored spinner 14. The angle of incidence α is also small to minimize distortion. The angle of incidence α is preferably about three degrees.

Mirrored spinner 14 generates scan beams 20, which pass through aperture 49 towards bar code 26.

Detector 16 is located below the outgoing scan beams 20 and has a field of view that encompasses the field of view of scan beams 20.

Fresnel lens 34 is located in front of detector 16.

Microcontroller 36, trigger 42, and trigger switch 44 are located in handle portion 50.

Indicator 39 is located on the outer surface of housing 46. Indicator 39 may include red and green lights.

Figure 3A:
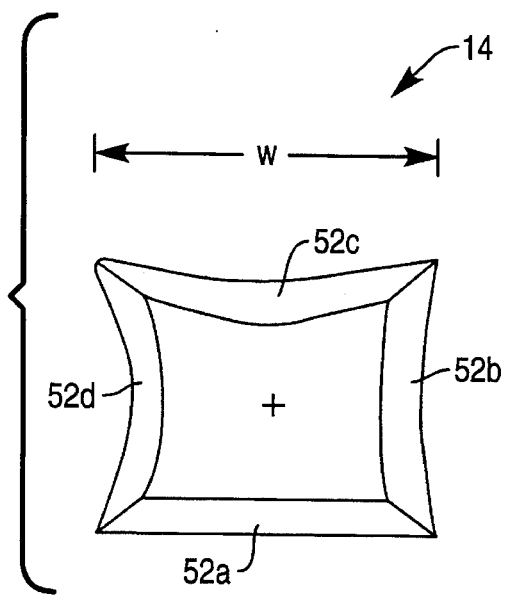
FIGS. 3A and 3B are the top views of first and second mirrored spinners within the scanner of the present invention.
Figure 3B:
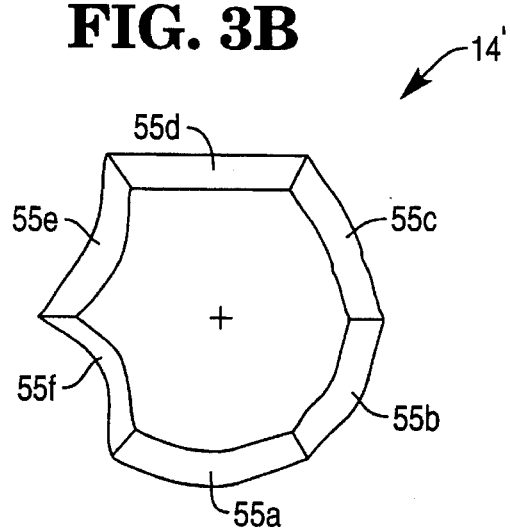

Turning now to FIGS. 3A and 3B, mirrored spinner 14 preferably includes four facets 52a–d, although mirrored spinner 14 may include as many as six facets. In the preferred embodiment, each of facets 52a–d has a concave surface which shortens the distance beyond aperture 49 where scan beams 20 focus (FIG. 3A). An alternative embodiment 14' includes facets 55a–f, which include at least one convex facet which provides a focal distance beyond the focal distance of a flat-surfaced facet (FIG. 3B). Facets 52a–d and 55a–f are preferably located around mirrored spinners 14 and 14' in order of focal distance. Mirrored spinners 14 and 14' are preferably injection-molded as single pieces.

The curvature of each of surfaces 52a–d is different. The radius of curvature of facet 52a is preferably infinite. The radius of curvature of facet 52b is preferably 900 mm. The radius of curvature of facet 52c is preferably 550 mm. The radius of curvature of facet 52d is preferably 430 mm. The radii and curvatures of facets 55a–f are also different and are on the same order of magnitude as facets 52a–d.

Each of facets 52a–d generates a scan beam 20 focused at a different distance from aperture 49. For facets which are concave, the focal distance is shorter than that of a flat-surfaced facet. Similarly, for facets which are convex, the focal distance is longer than that of a flat-surfaced facet.

Preferably, the curvature of facets 52a–d is toric, although other curvatures are also envisioned. To operate effectively, the size of each of facets 52a–d must be as small as possible to minimize distortion of scan beams 20 near the edges of facets 52a–d. In the preferred embodiment, facets 52a–d are about 3.5 mm in width, where width is determined by the shortest distance from edge to edge.

Figure 4:
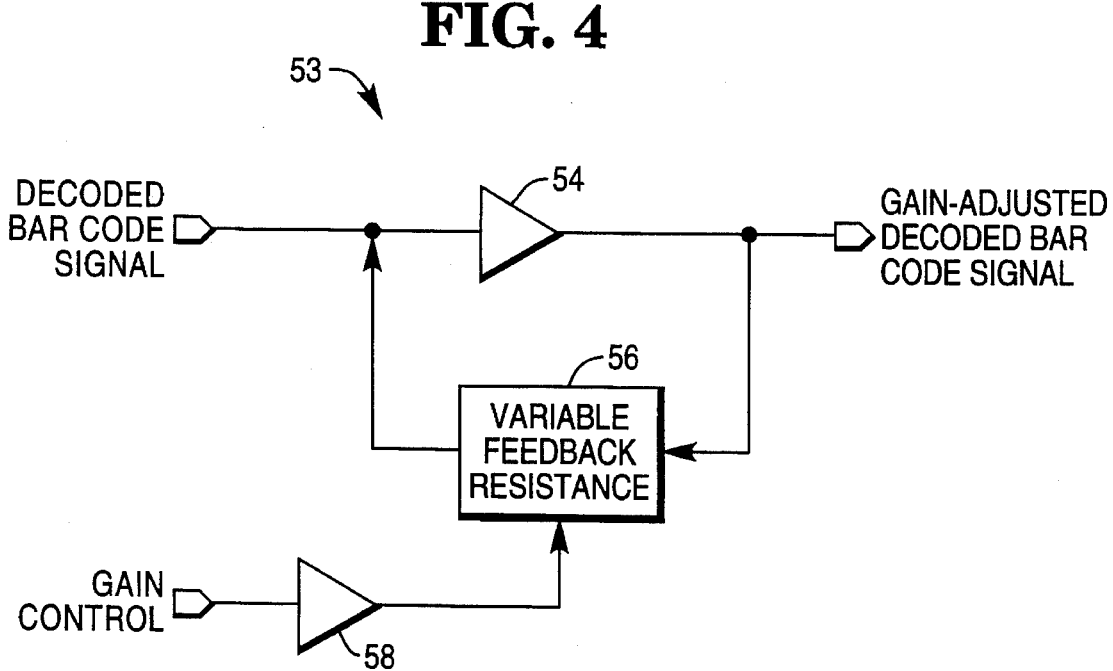
FIG. 4 is a schematic diagram of an amplification circuit coupled to the detector of the scanner of the present invention.

Referring now to FIG. 4, detector 16 includes amplification circuit 53 includes amplifier 54, variable feedback resistance 56, and gain control amplifier 58.

Amplifier 54 amplifies detected bar code signals generated by detector 16.

Variable feedback resistance 56 controls the gain of amplifier 54. Variable feedback resistance 56 is preferably a junction field effect transistor (JFET).

Gain control amplifier 58 controls variable feedback resistance 56 in accordance with control signals from microcontroller 36.

Figure 5:
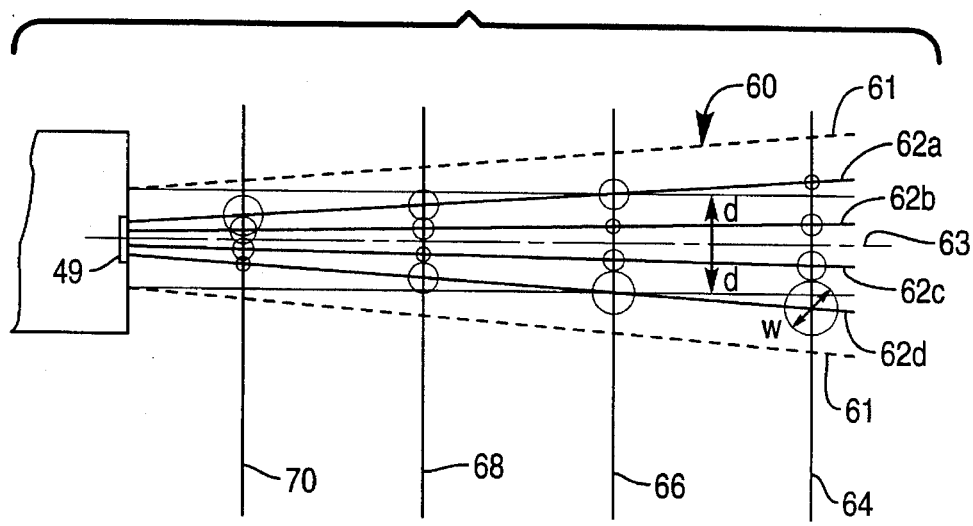
FIG. 5 is a top view of the field of view of the scanner of the present invention.

Turning now to FIG. 5, scanner 10 produces scan volume 60, which is described by boundaries 61 and centerline 63.

Scan beams 22 include beams 62a–d. Facet 52a produces beam 62a which focuses at focal plane 64. Facet 52b produces beam 62b which focuses at focal plane 66. Facet 52c produces beam 62c which focuses at focal plane 68. Finally, facet 52d produces beam 62d which focuses at focal plane 70.

The waist size w at each of focal planes 64–70 for each of beams 62a–d is also depicted in FIG. 5. For beam 62a, waist size w is a minimum at focal plane 64. For beam 62b, waist size w is a minimum at focal plane 66. For beam 62c, waist size w is a minimum at focal plane 68. Finally, for beam 62d, waist size w is a minimum at focal plane 70.

Figure 6:
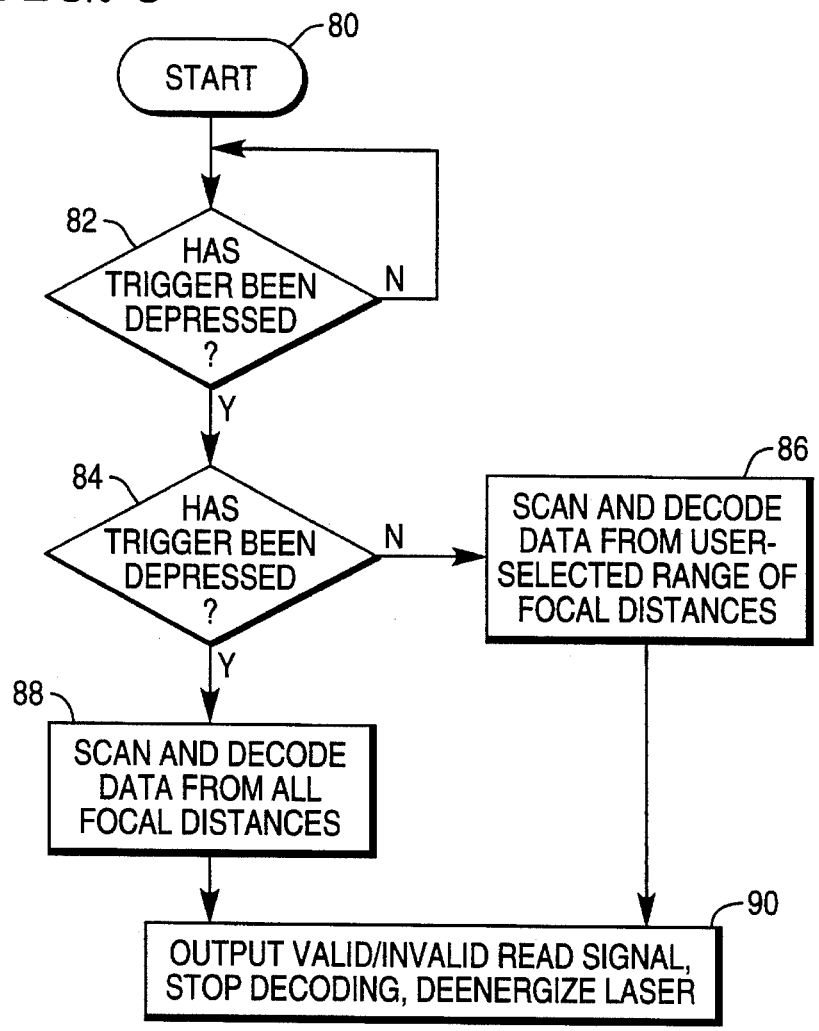
FIG. 6 is a flow diagram illustrating the operation of the scanner of the present invention.

Referring now to FIG. 6, the method of operation of scanner 10 begins at START 80.

In block 82, microcontroller 36 waits for a user of scanner 10 to depress trigger 42.

If the user depresses trigger 42, the method proceeds to block 84 in which microcontroller 36 determines if the user has pressed trigger 42 a second time (double click). If not, then the method proceeds to block 86 in which microcontroller 36 energizes laser 12, scans bar code label 26, decodes bar code data from within a predetermined range of focal distances, and ignores the data from the remaining portion of scan volume 60. For example, the range of focal lengths decoded after a single click may be from focal length 70 to 68 if the user wishes to hold items within that range. The predetermined range may be preprogrammed into microcontroller 36 by scanning a programming bar code label.

In block 90, microcontroller 36 outputs a valid or invalid read signal to indicator 39 and removes power from laser 12.

Returning to block 84, if microcontroller 36 detects a double-click of trigger 42, microcontroller 36 energizes laser 12, scans bar code label 26 and decodes the bar code data from all of scan volume 60. The method then proceeds to block 90.

Referring back to FIG. 5, microcontroller 36 uses the signal from angle sensor 40 to limit the sweep of beams 20. When beams 20 are focused more than a predetermined distance d from centerline 63, at scanner 10 microcontroller 36 reduces the drive current to laser 12 so that there is not enough reflected light for the user to see, for detector 16 to detect, or for microcontroller 36 to decode. Therefore, laser current is only at full power when laser 12 is focused within distance d of centerline 63.

Figure 7:
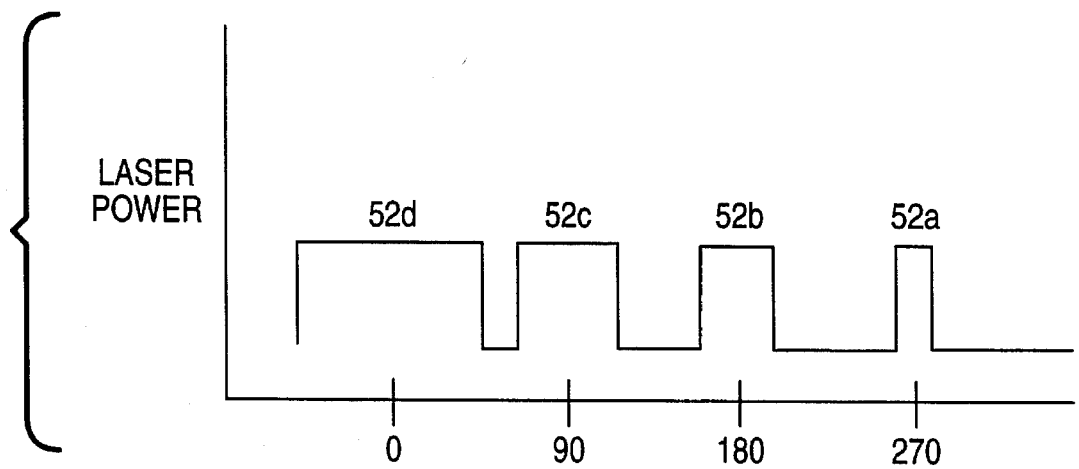
FIG. 7 is a graph of laser power versus spinner angle.

With reference to FIG. 7, microcontroller 36 provides the most current for illuminating facet 52a (270 degrees) since beam 62a is focused within distance d of centerline 63 from one edge of facet 52a to the other. Microcontroller 36 provides less current for illuminating facets 52b–c, and provides the least current for illuminating facet 52d (zero degrees).

Figure 8:
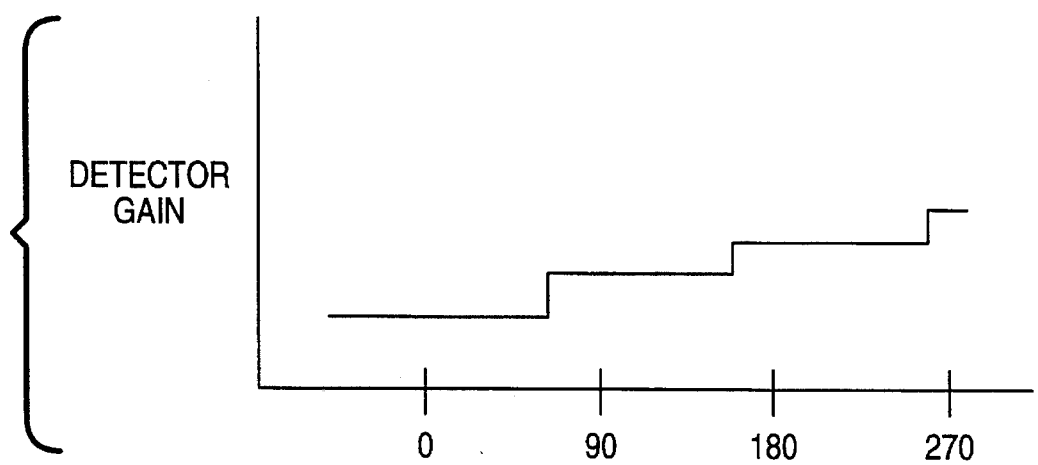
FIG. 8 is a graph of detected signal gain versus spinner angle.

With reference to FIG. 8, microcontroller 36 increases gain as focal distance increases. Scan lines increase in length as focal distance from aperture 49 increases. Furthermore, the intensity of reflected light 28 decreases as focal distance increases from aperture 49. Microcontroller 36 uses signals from angular sensor 40 to progressively increase the gain as focal distance increases to equalize intensity throughout scan volume 60. Thus, a single detector 16 can be used where multiple detectors would normally be required to collect enough reflected light 28. In FIG. 8, the signal from facet 52a (270 degrees) is amplified the most.

Although the present invention has been described with particular reference to certain preferred embodiments thereof, variations and modifications of the present invention can be effected within the spirit and scope of the following claims.

What is claimed is:

1. A multiple depth of field optical scanner comprising:

a laser for producing a laser beam within a field of view;

a mirrored spinner for reflecting the laser beam to produce scan beams for illuminating an item having a bar code label within a range of distances along a centerline of the scanner, the mirrored spinner including a plurality of facets wherein each facet has a predetermined curvature and generates a scan beam having a predetermined focal point on the centerline and wherein the curvature and centerline focal point of each facet are different than the curvature and centerline focal point of any other facet;

a detector for converting light reflected from the bar code label into first electrical signals based upon the intensity of the reflected light;

an amplifier circuit for amplifying the first electrical signals enough to produce second electrical signals having substantially equal amplitudes;

a microcontroller coupled to the amplifier circuit for decoding bar code information from the second electrical signals; and a distance selection circuit for signaling the microcontroller to decode only said second electrical signals corresponding to a predetermined range of focal distances.

2. A multiple depth of field optical scanner comprising:

a laser for producing a laser beam;

a mirrored spinner for reflecting the laser beam to produce scan beams for illuminating an item having a bar code label, the mirrored spinner including a plurality of facets wherein each facet has a predetermined curvature and generates a scan beam having a predetermined focal point and wherein the curvature and focal point of each facet are different than the curvature and focal point of any other facet;

a detector for converting light reflected from the bar code label into electrical signals based upon the intensity of the reflected light;

a microcontroller coupled to the detector for decoding bar code information from the electrical signals; and a distance selection circuit for signaling the microcontroller to decode only electrical signals corresponding to a predetermined range of focal distances.

3. The multiple depth of field optical scanner as recited in claim 2, wherein the facets include concave facets.

4. The multiple depth of field optical scanner as recited in claim 2, wherein the facets include convex facets.

5. The multiple depth of field optical scanner as recited in claim 2, wherein the mirrored spinner comprises a single injection-molded mirrored spinner.

6. The multiple depth of field optical scanner as recited in claim 2, wherein the mirrored spinner comprises four facets.

7. The multiple depth of field optical scanner as recited in claim 2, wherein the mirrored spinner comprises six facets.

8. The multiple depth of field optical scanner as recited in claim 2, wherein the distance selection circuit comprises:

an angle sensor for sensing the orientation of the mirrored spinner and for generating a signal containing the orientation information for use by the microcontroller;

a trigger engaged by a user; and a trigger switch actuated by engagement of the trigger;

wherein distance selection is determined by the number of times the user engages the trigger.

9. The multiple depth of field optical scanner as recited in claim 8, further comprising:

an amplifier circuit for amplifying the electrical signals enough to produce other electrical signals having substantially equal amplitudes, the microcontroller decoding the other electrical signals;

the microcontroller using the orientation information from the angle sensor to control the amplifier circuit.

10. The multiple depth of field optical scanner as recited in claim 2, wherein the laser has a beam centerline and wherein the microcontroller reduces current to the laser when the scan beams focus on points more than a predetermined distance from the centerline.

11. The multiple depth of field optical scanner as recited in claim 2, further comprising:

a deflector mirror for reflecting the laser beam towards the mirrored spinner, the angle between the incident laser beam and the reflected laser beam being no more than about 3 degrees.

12. The multiple depth of field optical scanner as recited in claim 2, further comprising:

collecting optics in front of the detector for equalizing the optical coupling of the reflected light across the field of view.

13. The multiple depth of field optical scanner as recited in claim 2, wherein the collecting optics comprises a Fresnel lens.

14. A multiple depth of field optical scanner comprising:

a laser for producing a laser beam having a centerline;

a mirrored spinner for reflecting the laser beam to produce scan beams for illuminating an item having a bar code label within a range of distances along a centerline of the scanner, the mirrored spinner including a plurality of facets wherein each facet has a predetermined curvature and generates a scan beam having a predetermined focal point on the centerline and wherein the curvature and centerline focal point of each facet are different than the curvature and centerline focal point of any other facet;

a detector for converting light reflected from the bar code label into electrical signals based upon the intensity of the reflected light;

a microcontroller coupled to the detector circuit for decoding bar code information from the electrical signals and for reducing current to the laser when the scan beams focus on points more than a predetermined distance from the centerline; and a distance selection circuit for signaling the microcontroller to decode only electrical signals corresponding to a predetermined range of focal distances.

15. A multiple depth of field optical scanner comprising:

a laser for producing a laser beam within a field of view;

a mirrored spinner for reflecting the laser beam to produce scan beams for illuminating an item having a bar code label, the mirrored spinner including a plurality of facets wherein each facet has a predetermined curvature and generates a scan beam having a predetermined focal point and wherein the curvature and focal point of each facet are different than the curvature and focal point of any other facet;

a detector for converting light reflected from the bar code label into first electrical signals based upon the intensity of the reflected light;

an amplifier circuit for amplifying the first electrical signals enough to produce second electrical signals having substantially equal amplitudes, including an angle sensor for sensing the orientation of the mirrored spinner and for generating a signal containing the orientation information for use by the microcontroller in controlling the amplifier circuit; and a microcontroller coupled to the amplifier circuit for decoding bar code information from the second electrical signals.

16. The multiple depth of field optical scanner as recited in claim 15, wherein the facets include concave facets.

17. The multiple depth of field optical scanner as recited in claim 15, wherein the facets include convex facets.

18. The multiple depth of field optical scanner as recited in claim 15, wherein the mirrored spinner comprises a single injection-molded mirrored spinner.

19. The multiple depth of field optical scanner as recited in claim 15, wherein the mirrored spinner comprises four facets.

20. The multiple depth of field optical scanner as recited in claim 15, wherein the mirrored spinner comprises six facets.

21. The multiple depth of field optical scanner as recited in claim 15, wherein the scanner has a beam centerline and wherein the microcontroller reduces current to the laser when the scan beams focus on points more than a predetermined distance from the centerline.

22. The multiple depth of field optical scanner as recited in claim 15, further comprising:

a deflector mirror for reflecting the laser beam towards the mirrored spinner, the angle between the incident laser beam and the reflected laser beam being no more than about 3 degrees.

23. The multiple depth of field optical scanner as recited in claim 15, further comprising:

a distance selection circuit for signaling the microcontroller to decode only said second electrical signals corresponding to a predetermined range of focal distances.

24. The multiple depth of field optical scanner as recited in claim 15, further comprising:

collecting optics in front of the detector for equalizing the optical coupling of the reflected light across the field of view.

25. The multiple depth of field optical scanner as recited in claim 24, wherein the collecting optics comprises a Fresnel lens.

26. A multiple depth of field optical scanner comprising:

a laser for producing a laser beam within a field of view;

a mirrored spinner for reflecting the laser beam to produce scan beams for illuminating an item having a bar code label, the mirrored spinner including a plurality of facets wherein each facet has a predetermined curvature and generates a scan beam having a predetermined focal point and wherein the curvature and focal point of each facet are different than the curvature and focal point of any other facet;

a detector for converting light reflected from the bar code label into first electrical signals based upon the intensity of the reflected light;

an amplifier circuit for amplifying the first electrical signals enough to produce second electrical signals having substantially equal amplitudes;

a microcontroller coupled to the amplifier circuit for decoding bar code information from the second electrical signals; and a distance selection circuit for signaling the microcontroller to decode only said second electrical signals corresponding to a predetermined range of focal distances.

27. The multiple depth of field optical scanner as recited in claim 26, wherein the facets include concave facets.

28. The multiple depth of field optical scanner as recited in claim 26, wherein the facets include convex facets.

29. The multiple depth of field optical scanner as recited in claim 26, wherein the mirrored spinner comprises a single injection-molded mirrored spinner.

30. The multiple depth of field optical scanner as recited in claim 26, wherein the mirrored spinner comprises four facets.

31. The multiple depth of field optical scanner as recited in claim 26, wherein the mirrored spinner comprises six facets.

32. The multiple depth of field optical scanner as recited in claim 26, wherein the amplifier circuit comprises:

an angle sensor for sensing the orientation of the mirrored spinner and for generating a signal containing the orientation information for use by the microcontroller in controlling the amplifier circuit.

33. The multiple depth of field optical scanner as recited in claim 32, wherein the scanner has a beam centerline and wherein the microcontroller reduces current to the laser when the scan beams focus on points more than a predetermined distance from the centerline.

34. The multiple depth of field optical scanner as recited in claim 26, further comprising:

a deflector mirror for reflecting the laser beam towards the mirrored spinner, the angle between the incident laser beam and the reflected laser beam being no more than about 3 degrees.

35. The multiple depth of field optical scanner as recited in claim 26, further comprising:

collecting optics in front of the detector for equalizing the optical coupling of the reflected light across the field of view.

36. The multiple depth of field optical scanner as recited in claim 35, wherein the collecting optics comprises a Fresnel lens.

37. A multiple depth of field optical scanner comprising:

a laser for producing a laser beam having a centerline;

a mirrored spinner for reflecting the laser beam to produce scan beams for illuminating an item having a bar code label, the mirrored spinner including a plurality of facets wherein each facet has a predetermined curvature and generates a scan beam having a predetermined focal point and wherein the curvature and focal point of each facet are different than the curvature and focal point of any other facet;

a detector for converting light reflected from the bar code label into electrical signals based upon the intensity of the reflected light;

a microcontroller coupled to the detector circuit for decoding bar code information from the electrical signals and for reducing current to the laser when the scan beams focus on points more than a predetermined distance from the centerline; and a distance selection circuit for signaling the microcontroller to decode only electrical signals corresponding to a predetermined range of focal distances.

38. A method for scanning a bar code label comprising the steps of:

producing a laser beam by a laser;

reflecting the laser beam off a mirrored spinner towards the bar code label, the mirrored spinner having a plurality of facets wherein each facet has a predetermined curvature and generates a scan beam having a predetermined focal point and wherein the curvature and focal point of each facet are different than the curvature and focal point of any other facet;

converting light reflected from the bar code label into electrical signals based upon the intensity of the reflected light by a detector;

signaling a microcontroller to decode only electrical signals corresponding to a predetermined range of focal distances; and decoding bar code information from the second electrical signals by the microcontroller.

* * * * *

UNITED STATES PATENT AND TRADEMARK OFFICE
CERTIFICATE OF CORRECTION

PATENT NO. : 5,484,990

DATED : January 16, 1996

INVENTOR(S) : Joseph M. Lindacher et al.

It is certified that error appears in the above-indentified patent and that said Letters Patent is hereby corrected as shown below:

Title Page, after "[73] Assignee: NCR Corporation" delete "Information Solutions Company" and substitute --(nka AT&T Global Information Solutions Company)--.

Signed and Sealed this

Twenty-third Day of December, 1997

Attest:

BRUCE LEHMAN

Attesting Officer

Commissioner of Patents and Trademarks